United States Patent
Satow et al.

(10) Patent No.: US 9,627,682 B2
(45) Date of Patent: Apr. 18, 2017

(54) NEGATIVE ELECTRODE FOR NONAQUEOUS ELECTROLYTE SECONDARY BATTERIES AND NONAQUEOUS ELECTROLYTE SECONDARY BATTERY INCLUDING THE SAME

(71) Applicant: Sanyo Electric Co., Ltd., Daito-shi, Osaka (JP)

(72) Inventors: Taiki Satow, Hyogo (JP); Masaki Deguchi, Tokushima (JP); Kentaro Takahashi, Hyogo (JP); Masaya Ugaji, Tokushima (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 41 days.

(21) Appl. No.: 14/651,359

(22) PCT Filed: Dec. 24, 2013

(86) PCT No.: PCT/JP2013/007539
§ 371 (c)(1),
(2) Date: Jun. 11, 2015

(87) PCT Pub. No.: WO2014/103281
PCT Pub. Date: Jul. 3, 2014

(65) Prior Publication Data
US 2015/0318545 A1    Nov. 5, 2015

(30) Foreign Application Priority Data
Dec. 26, 2012 (JP) ................ 2012-282029

(51) Int. Cl.
| | |
|---|---|
| *H01M 4/133* | (2010.01) |
| *H01M 4/36* | (2006.01) |
| *H01M 10/0525* | (2010.01) |
| *H01M 10/0569* | (2010.01) |
| *H01M 4/587* | (2010.01) |
| H01M 4/02 | (2006.01) |
| H01M 4/62 | (2006.01) |
| H01M 10/052 | (2010.01) |

(52) U.S. Cl.
CPC ......... *H01M 4/366* (2013.01); *H01M 4/133* (2013.01); *H01M 4/587* (2013.01); *H01M 10/0525* (2013.01); *H01M 10/0569* (2013.01); H01M 4/621 (2013.01); H01M 10/052 (2013.01); H01M 2004/027 (2013.01); H01M 2300/0034 (2013.01)

(58) Field of Classification Search
CPC .. H01M 4/366; H01M 10/0525; H01M 4/587; H01M 10/0569; H01M 4/133; H01M 2300/0034; H01M 2004/027; H01M 4/621; H01M 10/052; Y02E 60/122
See application file for complete search history.

(56) References Cited

U.S. PATENT DOCUMENTS

| | | |
|---|---|---|
| 2004/0023115 A1 | 2/2004 | Kato et al. |
| 2007/0190423 A1 | 8/2007 | Ishii et al. |
| 2012/0107700 A1 | 5/2012 | Deguchi |
| 2012/0148922 A1 | 6/2012 | Takahashi |

FOREIGN PATENT DOCUMENTS

| | | |
|---|---|---|
| JP | 11-283622 A | 10/1999 |
| JP | 2003-31218 A | 1/2003 |
| JP | 2003-297353 A | 10/2003 |
| JP | 2004-55139 A | 2/2004 |
| JP | 2004-127913 A | 4/2004 |
| JP | 2009-164013 A | 7/2009 |
| JP | 2010-267629 A | 11/2010 |
| JP | 2011-204576 A | 10/2011 |
| JP | 2011-204578 A | 10/2011 |
| JP | 2012-109280 A | 6/2012 |
| WO | 2005/069410 A1 | 7/2005 |
| WO | 2011/121912 A1 | 10/2011 |
| WO | 2012/001845 A1 | 1/2012 |

OTHER PUBLICATIONS

International Search Report dated Apr. 15, 2014, issued in corresponding application No. PCT/JP2013/007539 (2 pages).

*Primary Examiner* — Cynthia K Walls
(74) *Attorney, Agent, or Firm* — Westerman, Hattori, Daniels & Adrian, LLP

(57) ABSTRACT

A negative electrode for nonaqueous electrolyte secondary batteries includes a negative electrode core member and a negative electrode mixture layer attached to the negative electrode core member, wherein the negative electrode mixture layer contains negative electrode active material particles with a graphite structure and a binder, the mixture density of the negative electrode mixture layer is 1.5 g/cm$^3$ to 1.8 g/cm$^3$, the ratio $I_{(002)}/I_{(110)}$ of the diffraction intensity $I_{(002)}$ of the (002) plane to the diffraction intensity $I_{(110)}$ of the (110) plane satisfies $60 \leq I_{(002)}/I_{(110)} \leq 120$ as determined by measuring the negative electrode mixture layer by an X-ray diffraction method, the amount of particles with a size of 1 μm to 10 μm in the particle size distribution of a crushed product of the negative electrode mixture layer is 12% to 25% by volume.

5 Claims, No Drawings

NEGATIVE ELECTRODE FOR NONAQUEOUS ELECTROLYTE SECONDARY BATTERIES AND NONAQUEOUS ELECTROLYTE SECONDARY BATTERY INCLUDING THE SAME

TECHNICAL FIELD

The present invention relates to the increase in cycle life of a nonaqueous electrolyte secondary battery.

BACKGROUND ART

Nonaqueous electrolyte secondary batteries typified by lithium ion secondary batteries have high energy density and high capacity and therefore are used as driving power supplies for mobile data terminals such as mobile phones and notebook personal computers, electric vehicles, and the like.

Among the mobile data terminals, smartphones and tablet computers, which have been increasingly demanded in recent years, mostly have a structure in which a battery cannot be readily removed from a device body. Therefore, a nonaqueous electrolyte secondary battery for use in them is required to have higher energy density and longer life as compared to nonaqueous electrolyte secondary batteries used in conventional battery packs which are readily removable and replaceable.

Herein, in order to increase the energy density of a nonaqueous electrolyte secondary battery, for example, the packing density of an active material is increased by raising the rolling pressure during the manufacture of electrodes.

However, in the case of using graphite particles as a negative electrode active material, raising the rolling pressure allows basal planes parallel to the transverse direction of graphite crystals to be oriented in parallel to the transverse direction of a negative electrode and edge planes parallel to the stacking direction of the graphite crystals to be unlikely to be oriented to a surface of a negative electrode mixture layer (the degree of orientation is increased). Furthermore, the graphite particles are deformed or are cleaved, whereby the degree of orientation is further increased.

For example, in a lithium ion secondary battery, lithium ions are intercalated between layers from edge planes of graphite crystals. Therefore, when the degree of orientation is high, the lithium ions are unlikely to be stored in graphite particles; hence, input characteristics are reduced. The deformation of the graphite particles reduces the number of pores in a surface of a negative electrode mixture layer to further reduce the input characteristics.

Furthermore, the graphite particles are expanded and contracted by charge and discharge, respectively. This expands and contracts the negative electrode mixture layer. Therefore, repeating a charge/discharge cycle causes a problem that the contact resistance between negative electrode active material particles is increased and cycle life is reduced.

Therefore, in order to enhance battery characteristics of conventional nonaqueous electrolyte secondary batteries using a carbon material as a negative electrode active material, techniques disclosed in Patent Literatures 1 to 9 have been proposed.

CITATION LIST

Patent Literature

PTL 1: Japanese Published Unexamined Patent Application No. 2004-55139

PTL 2: Japanese Published Unexamined Patent Application No. 2010-267629

PTL 3: Japanese Published Unexamined Patent Application No. 2012-109280

PTL 4: WO 2005/069410

PTL 5: Japanese Published Unexamined Patent Application No. 11-283622

PTL 6: Japanese Published Unexamined Patent Application No. 2003-297353

PTL 7: Japanese Published Unexamined Patent Application No. 2003-31218

PTL 8: WO 2012/001845

PTL 9: Japanese Published Unexamined Patent Application No. 2004-127913

Patent Literatures 1 to 4 propose a technique in which a negative electrode for lithium secondary batteries is formed by pressing and combining a current collector and a mixture of graphite particles and an organic binder and the diffraction intensity ratio (002)/(110) determined by the X-ray diffraction of the negative electrode is 500 or less. This technique can provide a negative electrode in which reductions in rapid charge/discharge characteristics and cycle characteristics are small when the density of a negative electrode mixture layer is high and can provide a high-capacity lithium secondary battery including the negative electrode.

Patent Literature 5 proposes a technique in which the X-ray diffraction intensity ratio I(002)/I(110) of a carbon material that is a negative electrode active material is 250 or less. This technique can provide a nonaqueous electrolyte secondary battery with excellent high-load characteristics.

Patent Literature 6 proposes a technique in which a negative electrode includes a layer containing a carbonaceous material, the packing density d of the layer is 0.9 $g/cm^3$ to 1.9 $g/cm^3$, and the diffraction intensity ratio I(002)/I(110) of the negative electrode is 2,000 or less. This technique can provide a secondary battery having excellent battery capacity, cycle characteristics, and charge/discharge efficiency.

Patent Literature 7 proposes a negative electrode active material, containing a powdery carbon substance, for lithium secondary batteries. In the negative electrode active material, the X-ray diffraction intensity ratio I(110)/I(002) is 0.015 or less, the full width at half maximum of a peak corresponding to the (002) plane is 0.2° or more, and the interlayer distance d002 is 0.377 nm or more. This technique can provide a lithium secondary battery with good storage properties, particularly good storage properties at high temperature.

Patent Literature 8 proposes a technique in which a negative electrode mixture layer contains carbon material particles with breaking strength of 100 MPa or more. In the diffraction pattern of the negative electrode mixture layer, the ratio I(101)/I(100) satisfies 1.0<I(101)/I(100)<3.0 and the ratio I(110)/I(004) satisfies 0.25≤I(110)/I(004)≤0.45. This technique can provide a nonaqueous electrolyte secondary battery having high capacity and high input-output characteristics during charge/discharge at high current density under low-temperature circumstances.

Patent Literature 9 proposes that a mixture of synthetic graphite particles and spherical graphite particles with high circularity is used as a negative electrode active material. In a diffraction pattern obtained by measuring a pellet, formed from the synthetic graphite particles, having a density of 1.6 $g/cm^3$ by X-ray diffraction, the peak intensity ratio I(002)/I(110) is 1,000 or less. This technique can significantly improve charge/discharge cycle characteristics of a lithium secondary battery with high energy density and can enhance or maintain discharge rate characteristics, low-temperature discharge characteristics, and safety.

SUMMARY OF INVENTION

Technical Problem

By the way, the swelling of an electrode plate or the generation of gas in a battery swells and deforms the battery in some cases. The deformation of the battery may possibly cause the failure or damage of a device including it. In particular, in the case of using a deformable material such as a laminate film as an enclosure, the battery is likely to be deformed and therefore the influence thereof is significant. Thus, nonaqueous electrolyte secondary batteries are required to have increased cycle life and little change in size even after a charge/discharge cycle is repeated.

However, the techniques disclosed in Patent Literatures 1 to 9 do not take into account that the cycle life is increased and the swelling of a battery subjected to charge/discharge cycles is reduced.

The present invention solves the above problems and has an object to provide a high-capacity nonaqueous electrolyte secondary battery which has excellent cycle life and which is reduced in battery swell after a charge/discharge cycle is repeated.

Solution to Problem

The present invention is characterized in that a negative electrode for nonaqueous electrolyte secondary batteries includes a negative electrode core member and a negative electrode mixture layer attached to the negative electrode core member, wherein the negative electrode mixture layer contains negative electrode active material particles with a graphite structure and a binder, the mixture density of the negative electrode mixture layer is 1.5 $g/cm^3$ to 1.8 $g/cm^3$, the ratio $I(002)/I(110)$ of the diffraction intensity $I(002)$ of the (002) plane to the diffraction intensity $I(110)$ of the (110) plane satisfies $60 \leq I(002)/I(110) \leq 120$ as determined by measuring the negative electrode mixture layer by an X-ray diffraction method, and the amount of particles with a size of 1 μm to 10 μm in the particle size distribution of a crushed product of the negative electrode mixture layer is 12% to 25% by volume.

The negative electrode mixture layer contains the negative electrode active material particles, which have the graphite structure, and the binder. The binder binds active material particles together and the active material particles and the core member together. The negative electrode mixture layer may further contain an additive such as a thickener as required.

The ratio $I(002)/I(110)$ of diffraction intensity $I(002)$ of the (002) plane to the diffraction intensity $I(110)$ of the (110) plane as determined by measuring the negative electrode mixture layer by the X-ray diffraction method is an indicator relating to the orientation of the negative electrode active material particles in the negative electrode mixture layer. As this ratio is low, the orientation of crystal grains in the negative electrode active material particles is random. As this ratio is high, the grains are oriented in parallel to a surface of the negative electrode. That is, as this ratio is low, edge planes are oriented in random directions. As this ratio is high, basal planes are oriented in parallel to a surface of the negative electrode.

In the present invention, adjusting the ratio $I(002)/I(110)$ (also referred to as the degree of orientation of grains) to 60 to 120 allows the crystal grains in the negative electrode active material particles to be properly oriented in the negative electrode mixture layer, thereby enabling input characteristics of the negative electrode mixture layer to be enhanced.

Incidentally, when the ratio $I(002)/I(110)$ is greater than 120, the degree of orientation of the crystal grains in the negative electrode active material particles is high, input characteristics are low, and cycle characteristics are low. Furthermore, the increase in thickness of the negative electrode is large. However, it is difficult to form the negative electrode mixture layer such that the ratio $I(002)/I(110)$ is less than 60. The ratio $I(002)/I(110)$ is preferably 60 to 100.

The ratio $I(002)/I(110)$ can be adjusted by varying, for example, the rolling pressure of the negative electrode mixture layer, the size distribution of the negative electrode active material particles, the type thereof, or the like.

When the mixture density of the negative electrode mixture layer is less than 1.5 $g/cm^3$, the capacity of the battery is insufficient. When the mixture density thereof is greater than 1.8 $g/cm^3$, the degree of orientation of the grains in the negative electrode active material particles is high, input characteristics are insufficient, and cycle characteristics are low. Thus, it is limited to the above range from the balance between the battery capacity and the degree of orientation. It is preferably 1.5 $g/cm^3$ to 1.7 $g/cm^3$. The mixture density can be obtained by calculating the mass per unit volume of the negative electrode mixture layer. The mixture density can be controlled by adjusting, for example, the rolling pressure of the negative electrode mixture layer.

In the present invention, the amount of the particles with a size of 1 μm to 10 μm in the particle size distribution of the crushed product of the negative electrode mixture layer is 12% to 25% by volume. Herein, the particle size distribution of the crushed product is substantially consistent with the size distribution of the negative electrode active material particles during the preparation of the negative electrode and corresponds to the fact that the amount of the particles with a size of 1 μm to 10 μm in the volume-based size distribution of the negative electrode active material particles is 12% to 15% by volume. Herein, the particle size distribution of the crushed product of the negative electrode mixture layer is measured using a dispersion prepared by dispersing the crushed product in a predetermined dispersion medium. The dispersion medium used is, for example, water.

By the way, charge/discharge cycles repeatedly expand and contract the negative electrode to increase the thickness of the negative electrode mixture layer. The increase thereof gradually increases the unevenness of a battery reaction due to reductions in input characteristics or the increase in contact resistance between particles to reduce cycle characteristics. In the configuration of the present invention, the negative electrode active material particles contain 12% to 25% by volume of the particles with a size of 1 μm to 10 μm and therefore the particles with a size of 1 μm to 10 μm are interposed between particles with an average size. This allows the increase in thickness of the negative electrode mixture layer due to charge and discharge to be suppressed. Furthermore, the number of contacts between the negative electrode active material particles is increased, whereby the contact resistance between the particles is reduced. They result in that input characteristics can be enhanced and the contact resistance between the particles can be reduced even in the case of repeating a charge/discharge cycle.

When the amount of the particles with a size of 1 µm to 10 µm is less than 12% by volume, the contact resistance between the active material particles is increased and cycle characteristics are reduced. However, when the amount thereof is greater than 25% by volume, a reduction in initial battery capacity and reductions in cycle characteristics under high-temperature circumstances occur and gas is likely to be generated. This is because the particles with a size of 1 µm to 10 µm have a large active reaction area and therefore are likely to react with a nonaqueous electrolyte when a charge/discharge cycle is repeated. It is preferably 15% to 20% by volume.

The particle size D10 where the cumulative volume from the small-particle side in the volume-based particle size distribution of the crushed product (negative electrode active material particles) of the negative electrode mixture layer is 10%, the particle size D50 where being 50%, and the particle size D90 where being 90% preferably satisfy 5 µm<D10<10 µm, 18 µm<D50<24 µm, and 44 µm<D90<54 µm, respectively. The use of the negative electrode active material particles, which have such a size distribution, enables all of the cycle capacity retention, battery swelling, and the initial battery capacity to be further improved.

The particle size distribution of the crushed product (negative electrode active material particles) of the negative electrode mixture layer can be adjusted by mixing, for example, two or more types of active material particles with different size distributions from each other.

Herein, the negative electrode active material particles, which have the graphite structure, may partly have a graphite crystal structure at least and need not all have the graphite structure. The following particles can be used: for example, natural graphite particles, synthetic graphite particles, natural graphite particles surface-covered by amorphous carbon, synthetic graphite particles surface-covered by amorphous carbon, and the like. In particular, graphite particles with isotropically grown grains are preferably used. Since the graphite particles contain the isotropically grown grains, the increase in degree of orientation of the grains can be suppressed when the negative electrode is prepared. Furthermore, the graphite particles are unlikely to be deformed or cleaved during the rolling of the negative electrode mixture layer. Thus, input characteristics can be further enhanced.

Since the above effects act synergistically, the negative electrode of the above configuration has excellent capacity and cycle life and the increase in thickness of the negative electrode mixture layer and the generation of gas are reduced when charge and discharge are repeated.

In the negative electrode for nonaqueous electrolyte secondary batteries, the binding strength between the negative electrode active material particles is preferably 3 kgf/cm$^2$ or more. When the binding strength therebetween is less than 3 kgf/cm$^2$, the effect of suppressing the increase in thickness of the negative electrode mixture layer due to charge and discharge may possibly be insufficient.

Herein, the binder used may be a material known in this field. In particular, a rubber binder such as styrene-butadiene rubber, polybutadiene rubber, or nitrile-butadiene copolymer rubber is preferably used because high binding force is obtained. For example, the amount of added styrene-butadiene rubber is preferably 0.5% to 3% by mass and more preferably 0.8% to 2% by mass of the negative electrode mixture layer. When the amount thereof is extremely small, the binding strength may possibly be insufficient. When the amount thereof is extremely large, the binder may possibly act as a resistance component during charge and discharge.

The binding strength can be controlled by adjusting, for example, the size distribution of the negative electrode active material particles, the type of the binder, or the amount thereof.

In the negative electrode for nonaqueous electrolyte secondary batteries, the negative electrode mixture layer preferably has a sheet resistance of 2.5 Ω/sq or less and more preferably 1.7 Ω/sq to 2.0 Ω/sq in a discharged state as determined by a four-probe method. When the sheet resistance of the negative electrode mixture layer is greater than 2.5 Ω/sq, the cycle life may possibly be insufficient.

The term "discharged state" as used herein means that the potential of the negative electrode is 1.0 V (vs. Li/Li$^+$) or more versus metallic lithium.

The negative electrode is preferably used as a negative electrode for nonaqueous electrolyte secondary batteries. In particular, a nonaqueous electrolyte secondary battery according to the present invention includes the negative electrode, a positive electrode, a separator placed therebetween, and a nonaqueous electrolyte. The nonaqueous electrolyte contains a nonaqueous solvent and a lithium salt dissolved in the nonaqueous solvent.

The nonaqueous solvent preferably contains 5% to 50% by volume of a fluorobenzene compound and more preferably 10% to 20% by volume. Since the nonaqueous solvent contains 5% to 50% by volume of the fluorobenzene compound, the nonaqueous solvent has reduced viscosity; hence, input characteristics of the battery can be enhanced. On the other hand, the fluorobenzene compound is oxidatively degraded with the positive electrode. Therefore, when the amount of the fluorobenzene compound is excessive, the amount of gas generated in the battery is large. Herein, the amount of the fluorobenzene compound is a value at 1 atm and 25° C.

The fluorobenzene compound may be monofluorobenzene, which is produced by substituting a hydrogen atom of benzene with a fluorine atom, or polysubstituted fluorobenzene (difluorobenzene, trifluorobenzene, tetrafluorobenzene, pentafluorobenzene, and hexafluorobenzene), which is produced by substituting two or more hydrogen atoms of benzene with fluorine atoms. The fluorobenzene compound may contain a substituent such as a saturated hydrocarbon group containing one to four carbon atoms. In the case where two or more hydrogen atoms are substituted, the substitution positions thereof are not particularly limited.

Advantageous Effects of Invention

The present invention can provide a high-capacity nonaqueous electrolyte secondary battery which has excellent charge/discharge cycle life and which is reduced in battery swell after a charge/discharge cycle.

DESCRIPTION OF EMBODIMENTS

Embodiments of the present invention are described using examples. The present invention is not limited to the embodiments below and certain modifications can be made without departing from the scope of the present invention.

EXAMPLES

Example 1

Preparation of Negative Electrode Active Material

Graphite particles with isotropically grown grains were used as a negative electrode active material. The graphite particles were prepared from mosaic coke as described below.

Coal mosaic coke was pulverized, whereby a pulverized product with an average particle size of 10.0 μm was obtained. With 15 mass parts of binder pitch, 100 mass parts of the pulverized product was mixed at 150° C. for 30 minutes using a heating kneader. The obtained mixture was calcined at 3,000° C. in an inert atmosphere using a resistive furnace, followed by crushing the calcined product. The crushed product was sieved through a screen with 50 μm openings, whereby a graphite powder was obtained. The obtained graphite powder had been wholly graphitized. The obtained graphite powder was measured for particle size distribution, resulting in that the amount of particles with a size of 1 μm to 10 μm was 12% by volume.

The size distribution of particles of the negative electrode active material can be measured with, for example, a laser diffraction-scattering particle size distribution analyzer (for example, Microtrac manufactured by Nikkiso Co., Ltd.). In particular, the volume-based cumulative particle size distribution is determined using a dispersion prepared by dispersing the negative electrode active material particles in water. Another dispersion medium may be used instead of water.

In the size distribution of the negative electrode active material particles, D10 was 10.0 μm, D50 was 23.5 μm, and D90 was 54.0 μm.

[Preparation of Negative Electrode]

Negative electrode mixture slurry was prepared by mixing 100 mass parts of the graphite powder, 1 mass part of a carboxymethylcellulose sodium (CMC-Na) powder (produced by Daicel FineChem, Ltd.), and 1 mass part of styrene-butadiene rubber (SBR) together. Incidentally, SBR was mixed with the other components in the form of a dispersion (produced by JSR Corporation, an SBR content of 48% by mass) in which the dispersion medium was water.

The obtained negative electrode mixture slurry was applied to both surfaces of a negative electrode core member (electrolytic copper foil with a thickness of 8 μm) using a die coater. In this operation, the gap of the die coater was adjusted such that the mass per unit area of each coating on the negative electrode core member was 8.0 mg/cm². Thereafter, the coating was dried at 110° C. and was then rolled with a rolling roller, whereby a negative electrode mixture layer was formed so as to have a thickness of 115 μm and a mixture density of 1.5 g/cm³. The negative electrode mixture layer and the negative electrode core member were cut into a predetermined shape, whereby a negative electrode was obtained.

The ratio I(002)/I(110) can be measured using, for example, a powder X-ray diffractometer such as RINT-TTR III manufactured by Rigaku Corporation. In particular, the intensity I(002) of a diffraction peak, observed at a 2θ of about 26.4°, originating from the (002) plane of a graphite structure and the intensity I(110) of a diffraction peak, observed at a 2θ of about 78.0°, originating from the (110) plane thereof are determined from a θ-2θ diffraction pattern using Cu-Kα1 radiation. The ratio I(002)/I(110) can be obtained by dividing I(002) by I(110).

In this way, the ratio I(002)/I(110) was determined to be 60.

The binding strength between the negative electrode active material particles can be measured as described below. First, a 2 cm×3 cm negative electrode piece is cut out of the negative electrode, which includes the negative electrode mixture layers formed on the negative electrode core member. One of the negative electrode mixture layers is stripped from a surface of the negative electrode piece and the other one is left on another surface thereof. A surface of the negative electrode mixture layer on the negative electrode piece is attached to an adhesive layer of a double-sided tape (No. 515 manufactured by Nitto Denko Corporation). Next, the negative electrode mixture layer is exposed by removing the negative electrode core member from the negative electrode piece, whereby a measurement sample including the negative electrode mixture layer attached to a surface of the double-sided tape is prepared. The double-sided tape side of the measurement sample is attached to the tip of a gauge head (a tip diameter of 0.2 cm) of a tacking tester (the trade name TAC-II, manufactured by RHESCA Corporation limited). Next, a peeling test is performed in such a manner that a measurement probe is pressed against and removed from the negative electrode mixture layer under conditions below. In the peeling test, the maximum load necessary to cause the separation between the active material particles. A value obtained by dividing the obtained maximum load by the cross-sectional area (0.031 cm²) of the gauge head is defined as the binding strength (kgf/cm²) between the active material particles.

<Test Conditions>

Indentation rate of measurement probe: 30 mm/minute
Indentation time of measurement probe: 10 seconds
Indentation load of measurement probe: 0.4 kgf
Separation rate of measurement probe: 600 mm/minute In this way, the binding strength was determined to be 3.5 kgf/cm².

The sheet resistance of each negative electrode mixture layer can be measured as described below. First, a measurement sample is prepared by attaching a 2 cm×2 cm negative electrode mixture layer to a surface of the double-sided tape in substantially the same manner as that used to measure the binding strength. A four-point probe of a resistivity meter (for example, Loresta GPMCP-T610 manufactured by Mitsubishi Chemical Analytech Co., Ltd.) is brought into contact with this sample, whereby the sheet resistance of the negative electrode mixture layer can be determined.

In this way, the sheet resistance was determined to be 2.4 Ω/sq. Incidentally, the potential of the negative electrode was 1.0 V (vs Li/Li⁺) or more when the sheet resistance was measured. This applies to examples and comparative examples below.

Incidentally, in the examples and comparative examples below, the size distribution of negative electrode active material particles, the binding strength between the negative electrode active material particles, the sheet resistance of a negative electrode mixture layer, and the ratio I(002)/I(110) were determined as described above.

[Preparation of Positive Electrode]

Positive electrode mix slurry was prepared in such a manner that 100 mass parts of lithium cobaltate (LiCoO₂), which is a positive electrode active material, and 4 mass parts of polyvinylidene fluoride, which is a binder, were mixed with an appropriate amount of N-methylpyrrolidone. The obtained positive electrode mix slurry was applied to both surfaces of 15 μm thick aluminium foil, which is a positive electrode core member, followed by drying and rolling, whereby positive electrode mixture layers were formed. The obtained positive electrode mixture layers and the positive electrode core member were cut into a predetermined shape, whereby a positive electrode was obtained.

[Preparation of Nonaqueous Electrolyte]

Ethylene carbonate, ethyl methyl carbonate, and monofluorobenzene were mixed together at a volume ratio of 30:65:5 (25° C., 1 atm), whereby a solvent mixture was obtained. In the solvent mixture, 1 mol/L of LiPF₆ was dissolved. To the obtained solution, 2% by mass of vinylene carbonate was added, whereby a nonaqueous electrolyte was obtained.

[Preparation of Battery]

Next, an aluminium lead was welded to the positive electrode and a nickel lead was welded to the negative electrode. The positive electrode and the negative electrode were wound with a separator (A089 (trade name) manufactured by Celgard K.K.) therebetween, the separator including a microporous film, made of polyethylene, having a thickness of 20 µm, whereby a flat electrode assembly with substantially an oval cross section was prepared. The electrode assembly was housed in a pouch enclosure made of aluminium, 2.5 g of the nonaqueous electrolyte was poured in the enclosure, and the enclosure was sealed, whereby a pouch-type nonaqueous electrolyte secondary battery having a height of 50 mm, a width of 30 mm, and an inner space with a thickness of 5.2 mm was prepared. The prepared battery had a design capacity of 850 mAh.

Example 2

With a graphite powder obtained in substantially the same manner as that described in Example 1, 5% by mass of natural graphite particles with an average size D50 of 10 µm were mixed, whereby mixed negative electrode active material particles were obtained. A nonaqueous electrolyte secondary battery of Example 2 was prepared in substantially the same manner as that described in Example 1 except that the mixed negative electrode active material particles were used.

In the size distribution of the mixed negative electrode active material particles, the amount of particles with a size of 1 µm to 10 µm was 15% by volume. Furthermore, D10 was 8.8 µm, D50 was 21.2 µm, and D90 was 54.0 µm.

The binding strength between the negative electrode active material particles was 3.7 kgf/cm$^2$. The sheet resistance of a negative electrode mixture layer was 2.0 Ω/sq. The ratio I(002)/I(110) was 60.

Example 3

With a graphite powder obtained in substantially the same manner as that described in Example 1, 8% by mass of natural graphite particles with an average size D50 of 10 µm were mixed, whereby mixed negative electrode active material particles were obtained. A nonaqueous electrolyte secondary battery of Example 3 was prepared in substantially the same manner as that described in Example 1 except that the mixed negative electrode active material particles were used.

In the size distribution of the mixed negative electrode active material particles, the amount of particles with a size of 1 µm to 10 µm was 20% by volume. Furthermore, D10 was 8.6 µm, D50 was 20.4 µm, and D90 was 54.0 µm.

The binding strength between the negative electrode active material particles was 4.0 kgf/cm$^2$. The sheet resistance of a negative electrode mix layer was 1.7 Ω/sq. The ratio I(002)/I(110) was 60.

Example 4

With a graphite powder obtained in substantially the same manner as that described in Example 1, 10% by mass of natural graphite particles with an average size D50 of 10 µm were mixed, whereby mixed negative electrode active material particles were obtained. A nonaqueous electrolyte secondary battery of Example 4 was prepared in substantially the same manner as that described in Example 1 except that the mixed negative electrode active material particles were used.

In the size distribution of the mixed negative electrode active material particles, the amount of particles with a size of 1 µm to 10 µm was 24% by volume. Furthermore, D10 was 8.3 µm, D50 was 19.1 µm, and D90 was 53.8 µm.

The binding strength between the negative electrode active material particles was 4.6 kgf/cm$^2$. The sheet resistance of a negative electrode mixture layer was 1.2 Ω/sq. The ratio I(002)/I(110) was 60.

Example 5

With a graphite powder obtained in substantially the same manner as that described in Example 1, 20% by mass of natural graphite particles with an average size D50 of 20 µm were mixed, whereby mixed negative electrode active material particles were obtained. A nonaqueous electrolyte secondary battery of Example 5 was prepared in substantially the same manner as that described in Example 1 except that the mixed negative electrode active material particles were used.

In the size distribution of the mixed negative electrode active material particles, the amount of particles with a size of 1 µm to 10 µm was 15% by volume. Furthermore, D10 was 9.9 µm, D50 was 23.2 µm, and D90 was 54.0 µm.

The binding strength between the negative electrode active material particles was 3.9 kgf/cm$^2$. The sheet resistance of a negative electrode mixture layer was 2.3 Ω/sq. The ratio I(002)/I(110) was 95.

Example 6

With a graphite powder obtained in substantially the same manner as that described in Example 1, 30% by mass of natural graphite particles with an average size D50 of 20 µm were mixed, whereby mixed negative electrode active material particles were obtained. A nonaqueous electrolyte secondary battery of Example 6 was prepared in substantially the same manner as that described in Example 1 except that the mixed negative electrode active material particles were used.

In the size distribution of the mixed negative electrode active material particles, the amount of particles with a size of 1 µm to 10 µm was 17% by volume. Furthermore, D10 was 9.8 µm, D50 was 23.1 µm, and D90 was 53.8 µm.

The binding strength between the negative electrode active material particles was 4.5 kgf/cm$^2$. The sheet resistance of a negative electrode mixture layer was 2.1 Ω/sq. The ratio I(002)/I(110) was 113.

Example 7

A nonaqueous electrolyte secondary battery of Example 7 was prepared in substantially the same manner as that described in Example 1 except that the thickness of a negative electrode was adjusted to 103 µm and the mixture density of each negative electrode mix layer was adjusted to 1.7 g/cm$^3$ when the negative electrode was prepared.

The binding strength between negative electrode active material particles was 4.1 kgf/cm$^2$. The sheet resistance of the negative electrode mix layer was 2.1 Ω/sq. The ratio I(002)/I(110) was 71.

Example 8

A nonaqueous electrolyte secondary battery of Example 8 was prepared in substantially the same manner as that described in Example 1 except that the thickness of a negative electrode was adjusted to 98 μm and the mix density of each negative electrode mix layer was adjusted to 1.8 g/cm$^3$ when the negative electrode was prepared.

The binding strength between negative electrode active material particles was 4.9 kgf/cm$^2$. The sheet resistance of the negative electrode mix layer was 1.9 Ω/sq. The ratio I(002)/I(110) was 83.

Example 9

A nonaqueous electrolyte secondary battery of Example 9 was prepared in substantially the same manner as that described in Example 1 except that a solvent mixture prepared by mixing ethylene carbonate and ethyl methyl carbonate together at a volume ratio of 30:70 (25° C., 1 atm) was used to prepare a nonaqueous electrolyte.

Example 10

A nonaqueous electrolyte secondary battery of Example 10 was prepared in substantially the same manner as that described in Example 1 except that a solvent mixture prepared by mixing ethylene carbonate, ethyl methyl carbonate, and monofluorobenzene together at a volume ratio of 20:70:10 (25° C., 1 atm) was used to prepare a nonaqueous electrolyte.

Example 11

A nonaqueous electrolyte secondary battery of Example 11 was prepared in substantially the same manner as that described in Example 1 except that a solvent mixture prepared by mixing ethylene carbonate, ethyl methyl carbonate, and monofluorobenzene together at a volume ratio of 20:60:20 (25° C., 1 atm) was used to prepare a nonaqueous electrolyte.

Example 12

A nonaqueous electrolyte secondary battery of Example 12 was prepared in substantially the same manner as that described in Example 1 except that a solvent mixture prepared by mixing ethylene carbonate, ethyl methyl carbonate, and monofluorobenzene together at a volume ratio of 20:40:40 (25° C., 1 atm) was used to prepare a nonaqueous electrolyte.

Example 13

A nonaqueous electrolyte secondary battery of Example 13 was prepared in substantially the same manner as that described in Example 1 except that a solvent mixture prepared by mixing ethylene carbonate, ethyl methyl carbonate, and monofluorobenzene together at a volume ratio of 20:30:50 (25° C., 1 atm) was used to prepare a nonaqueous electrolyte.

Comparative Example 1

With a graphite powder obtained in substantially the same manner as that described in Example 1, 60% by mass of natural graphite particles with an average size D50 of 20 μm were mixed, whereby mixed negative electrode active material particles were obtained. A nonaqueous electrolyte secondary battery of Comparative Example 1 was prepared in substantially the same manner as that described in Example 1 except that the mixed negative electrode active material particles were used.

In the size distribution of the mixed negative electrode active material particles, the amount of particles with a size of 1 μm to 10 μm was 14% by volume. Furthermore, D10 was 9.8 μm, D50 was 23.2 μm, and D90 was 53.8 μm.

The binding strength between the negative electrode active material particles was 5.2 kgf/cm$^2$. The sheet resistance of a negative electrode mix layer was 2.3 Ω/sq. The ratio I(002)/I(110) was 152.

Comparative Example 2

A nonaqueous electrolyte secondary battery of Comparative Example 2 was prepared in substantially the same manner as that described in Example 1 except that a graphite powder obtained in substantially the same manner as that described in Example 1 was sieved through a screen with 5 μm openings and only the residue thereof was used as a negative electrode active material.

In the size distribution of particles of the negative electrode active material, the amount of particles with a size of 1 μm to 10 μm was 8% by volume. Furthermore, D10 was 12.0 μm, D50 was 23.8 μm, and D90 was 54.2 μm.

The binding strength between the negative electrode active material particles was 2.7 kgf/cm$^2$. The sheet resistance of a negative electrode mix layer was 3.6 Ω/sq. The ratio I(002)/I(110) was 61.

Comparative Example 3

With a graphite powder obtained in substantially the same manner as that described in Example 1, 20% by mass of natural graphite particles with an average size D50 of 10 μm were mixed, whereby mixed negative electrode active material particles were obtained. A nonaqueous electrolyte secondary battery of Comparative Example 3 was prepared in substantially the same manner as that described in Example 1 except that the mixed negative electrode active material particles were used.

In the size distribution of the mixed negative electrode active material particles, the amount of particles with a size of 1 μm to 10 μm was 29% by volume. Furthermore, D10 was 8.0 μm, D50 was 18.0 μm, and D90 was 53.2 μm.

The binding strength between the negative electrode active material particles was 4.0 kgf/cm$^2$. The sheet resistance of a negative electrode mix layer was 2.2 Ω/sq. The ratio I(002)/I(110) was 82.

Comparative Example 4

A nonaqueous electrolyte secondary battery of Comparative Example 4 was prepared in substantially the same manner as that described in Example 1 except that the thickness of a negative electrode was adjusted to 92 μm and the mix density of each negative electrode mix layer was adjusted to 1.9 g/cm$^3$ when the negative electrode was prepared.

The binding strength between negative electrode active material particles was 4.9 kgf/cm$^2$. The sheet resistance of the negative electrode mix layer was 2.0 Ω/sq. The ratio I(002)/I(110) was 194.

(Evaluation)

[Cycle Test]

The batteries prepared in Examples 1 to 13 and Comparative Examples 1 to 4 were subjected to a cycle test in which a charge/discharge cycle was repeated 500 times under 25° C. and 45° C. circumstances under conditions below, whereby the capacity retention and the battery swelling rate were determined. Obtained results are shown in Table 1.

Charge/discharge conditions of each cycle are as described below.

Charge: Charge is performed at a constant current of 1.0 lt (850 mA) until the voltage of a battery reaches 4.2 V. Next, charge is performed at a constant voltage of 4.2 V until the current reaches 1/20 lt (42.5 mA).

Rest of 10 Minutes

Discharge: Discharge is performed at a constant current of 1.0 lt (850 mA) until the battery voltage reaches 3.0 V.

Rest of 10 Minutes

The capacity retention (%) was calculated using the following formula:

[(500th cycle discharge capacity)/(1$^{st}$ cycle discharge capacity)]×100.

The battery swelling rate (%) was calculated using the following formula:

[(Thickness of cell in charged state after cycle test)−(thickness of cell in charged state before cycle test)]/(thickness of cell in charged state after cycle test)×100.

Incidentally, in Table 1, the ratio I(002)/I(110) is shown in the form of the degree of orientation of grains. Furthermore, the amount of particles with a size of 1 μm to 10 μm, the mixture density, the binding strength, the sheet resistance, and the content of monofluorobenzene (FB) are shown.

negative electrode was high; hence, the capacity retention was low and the battery swelling was large.

On the other hand, the batteries of Examples 1 to 13, in which the degree of orientation of grains was 60 to 120, exhibited a capacity retention higher than that of Comparative Example 1, that is, a capacity retention of 80% or more at 25° C. and 45° C. and a battery swelling rate lower than that of Comparative Example 1, that is, a battery swelling rate of 6% or less at 25° C. and a battery swelling rate of 9% or less at 45° C. From the above results, the degree of orientation of grains needs to be 60 to 120.

In the battery of Comparative Example 2, the amount of the particles with a size of 1 μm to 10 μm was small, 8% by volume, in the size distribution of the negative electrode active material particles and the sheet resistance of the negative electrode mixture layer was large, 3.6 Ω/sq. As a result, the capacity retention at 25° C. was probably significantly reduced to 69%.

The batteries of Examples 3 and 4, in which the amount of the particles with a size of 1 μm to 10 μm was 15% and 20%, respectively, by volume, exhibited excellent values, that is, a capacity retention of 90% or more at 25° C. and a capacity retention of 80% or more at 45° C. with an increase in content.

However, in the battery of Comparative Example 3, in which the amount of the particles with a size of 1 μm to 10 μm was increased to 29% by volume, the capacity retention at 45° C. was reduced to 40% and the battery swelling rate was significantly increased to 13%. This is probably because since the amount of the particles with a size of 1 μm to 10

TABLE 1

| | Degree of orientation of grains | Amount of articles with a size of 1 μm to 10 μm (volume percent) | Mixture density (g/cm$^3$) | Binding strength (kgf/cm$^3$) | Sheet resistance (Ω/sq) | FB content (volume percent) | Capacity retention at 25° C. (%) | Battery swelling rate at 25° C. (%) | Capacity retention at 45° C. (%) | Battery swelling rate at 45° C. (%) |
|---|---|---|---|---|---|---|---|---|---|---|
| Example 1 | 60 | 12 | 1.5 | 3.5 | 2.4 | 5 | 85 | 6 | 85 | 7 |
| Example 2 | 60 | 15 | 1.5 | 3.7 | 2 | 5 | 91 | 4 | 84 | 7 |
| Example 3 | 60 | 20 | 1.5 | 4 | 1.7 | 5 | 92 | 4 | 84 | 8 |
| Example 4 | 60 | 24 | 1.5 | 4.6 | 1.2 | 5 | 90 | 5 | 80 | 8 |
| Example 5 | 95 | 15 | 1.5 | 3.9 | 2.3 | 5 | 84 | 5 | 81 | 7 |
| Example 6 | 113 | 17 | 1.5 | 4.5 | 2.1 | 5 | 82 | 4 | 81 | 8 |
| Example 7 | 71 | 12 | 1.7 | 4.1 | 2.1 | 5 | 85 | 6 | 85 | 7 |
| Example 8 | 83 | 12 | 1.8 | 4.9 | 1.9 | 5 | 82 | 6 | 82 | 8 |
| Example 9 | 60 | 12 | 1.5 | 3.5 | 2.4 | 0 | 80 | 6 | 85 | 5 |
| Example 10 | 60 | 12 | 1.5 | 3.5 | 2.4 | 10 | 92 | 4 | 82 | 7 |
| Example 11 | 60 | 12 | 1.5 | 3.5 | 2.4 | 20 | 91 | 4 | 82 | 8 |
| Example 12 | 60 | 12 | 1.5 | 3.5 | 2.4 | 40 | 88 | 4 | 80 | 9 |
| Example 13 | 60 | 12 | 1.5 | 3.5 | 2.4 | 50 | 87 | 5 | 80 | 9 |
| Comparative Example 1 | 152 | 14 | 1.5 | 5.2 | 2.3 | 5 | 78 | 10 | 74 | 14 |
| Comparative Example 2 | 61 | 8 | 1.5 | 2.7 | 3.6 | 5 | 69 | 11 | 78 | 16 |
| Comparative Example 3 | 82 | 29 | 1.5 | 4 | 2.2 | 5 | 80 | 8 | 40 | 13 |
| Comparative Example 4 | 194 | 12 | 1.9 | 4.9 | 2 | 5 | 68 | 13 | 72 | 15 |

As is clear from Table 1, the battery of Comparative Example 1, in which the degree of orientation of grains (ratio I(002)/I(110)) was greater than 120, had a capacity retention of 78% at 25° C., a capacity retention of 74% at 45° C., a battery swelling rate of 10% at 25° C., and a battery swelling rate of 14% at 45° C. In the battery of Comparative Example 1, the degree of orientation of grains in the μm was increased, the active reaction area of the negative electrode was increased and the negative electrode active material reacted vigorously with the nonaqueous electrolyte particularly under a 45° C. circumstance.

From the above results, the amount of particles with a size of 1 μm to 10 μm needs to be 12% to 25% by volume.

The battery of Example 7, in which the mixture density of the negative electrode mix layer was 1.7 g/cm$^3$, and the battery of Example 8, in which the mixture density was 1.8 g/cm$^3$, exhibited a good value, that is, a capacity retention of 82% or more at 25° C. and 45° C. Furthermore, the batteries of Examples 7 and 8 exhibited small values, that is, a battery swelling rate of 6% at 25° C. and a battery swelling rate of 8% at 45° C.

On the other hand, in the battery of Comparative Example 4, in which the mixture density of the negative electrode mix layer was increased to 1.9 g/cm$^3$, the capacity retention at 25° C. was significantly low, 68%. This is probably because since the negative electrode mixture layer was rolled to have high density, the degree of orientation of grains was excessively large and input characteristics were impaired.

From the above results, the mixture density needs to be 1.8 g/cm$^3$ or less. Incidentally, in order to obtain a high-capacity battery, the mixture density needs to be 1.5 g/cm$^3$ or more.

The batteries of Examples 10 and 11, in which the amount of monofluorobenzene was increased, included the same negative electrode as that of the battery of Example 1 and exhibited a higher value, that is, a capacity retention of 91% or more at 25° C., and a smaller value, that is, a battery swelling rate of 4%, as compared to the battery of Example 1. This is probably because since the amount of monofluorobenzene was increased, the viscosity of the nonaqueous electrolytes was reduced and, as a result, input characteristics were improved.

The battery of Example 12, in which the amount of monofluorobenzene was increased to 40%, and the battery of Example 13, in which the amount of monofluorobenzene was increased to 50%, exhibited slightly reduced capacity retention at 45° C. and slightly increased battery swelling rate as compared to the battery of Example 1, which is sufficiently within an allowable range. Incidentally, the reason for these results is because monofluorobenzene was oxidatively degraded with the positive electrode.

From the above results, the content of a fluorobenzene compound is preferably 5% to 50% by volume.

(Addenda)

In each of the examples, the size distribution of the negative electrode active material particles was determined. However, in the case of a finished product, particles can be separated from each other in such a manner that a negative electrode mixture layer is stripped from a negative electrode core member and is then stirred or ultrasonically dispersed in, for example, water. The particle size distribution of a crushed product may be measured using a dispersion containing the separated particles. Regarding the average particle size D50, the particle size where the cumulative volume from the large-particle side is 50% may be regarded as the average particle size D50.

In each of the examples, electrolytic copper foil was used as a negative electrode core member. Instead, copper alloy foil or the like can be used. Alternatively, a punching metal made of copper or a copper alloy can be used.

In each of the examples, the pouch enclosure made of aluminium was used. Instead, an enclosure including an aluminium-laminated film can be used. The following can be used as the aluminium-laminated film: not only one having a structure in which resin layers are applied to both surfaces of an aluminium layer with adhesive layers but also one having a structure in which a resin layer is applied to only a surface (battery inner side) of an aluminium layer with an adhesive layer. The resin layer or layers may be made of, for example, a polyolefin polymer such as polyethylene or polypropylene; a polyester polymer such as polyethylene terephthalate; a polyvinylidene polymer such as polyvinylidene fluoride or polyvinylidene chloride; or a polyamide polymer such as nylon 6, nylon 66, or nylon 7.

Since the negative electrode according to the present invention is used as described above, the swelling of a battery is significantly reduced. Therefore, the negative electrode according to the present invention is particularly suitable for batteries including a deformable enclosure.

The following can be used alone or in combination as positive electrode active materials: for example, a lithium-containing nickel-cobalt-manganese composite oxide (LiNi$_x$Co$_y$Mn$_z$O$_2$, x+y+z=1, 0≤x≤1, 0≤y≤1, 0≤z≤1), a lithium-containing cobalt composite oxide (LiCoO$_2$), a lithium-containing nickel composite oxide (LiNiO$_2$), a lithium-containing nickel-cobalt composite oxide (LiCo$_x$Ni$_{1-x}$O$_2$), a lithium-containing manganese composite oxide (LiMnO$_2$), spinel lithium manganate (LiMn$_2$O$_4$), or a lithium-containing transition metal composite oxide such as a compound obtained by partially substituting a transition metal contained in these oxides with another element (for example, Ti, Zr, Mg, Al, or the like).

A nonaqueous electrolyte contains a nonaqueous solvent and an electrolyte salt dissolved therein. The nonaqueous electrolyte may contain a fluorobenzene compound or not. Examples of a solvent other than the fluorobenzene compound include high-dielectric constant solvents, such as ethylene carbonate, propylene carbonate, butylene carbonate, γ-butyrolactone, and γ-valerolactone, having high lithium salt solubility; linear carbonates such as diethyl carbonate, dimethyl carbonate, and ethyl methyl carbonate; and low-viscosity solvents such as tetrahydrofuran, 1,2-dimethoxyethane, diethylene glycol dimethyl ether, 1,3-dioxolane, 2-methoxytetrahydrofuran, diethyl ether, ethyl acetate, propyl acetate, and ethyl propionate. These solvents may be used alone or in combination.

One or more of the following salts can be used as electrolyte salts: for example, lithium salts such as LiPF$_6$, LiBF$_4$, LiCF$_3$SO$_3$, LiN(CF$_3$SO$_2$)$_2$, LiN(C$_2$F$_5$SO$_2$)$_2$, LiN(CF$_3$SO$_2$)(C$_4$F$_9$SO$_2$), LiC(C$_2$F$_5$SO$_2$)$_3$, LiAsF$_6$, LiClO$_4$, Li$_2$B$_{10}$Cl$_{10}$, Li$_2$B$_{12}$I$_{12}$, LiB(C$_2$O$_4$)F$_2$, and LiP(C$_2$O$_4$)$_2$F$_2$. The total concentration of electrolyte salts in the nonaqueous electrolyte is preferably 0.5 mol/liter to 2.0 mol/liter.

For example, an additive such as vinylene carbonate, cyclohexylbenzene, or tert-amylbenzene may be added to the nonaqueous electrolyte.

The following membrane can be used as a separator: a microporous membrane made of, for example, an olefinic resin such as polyethylene or polypropylene, a mixture thereof, or a laminate thereof.

INDUSTRIAL APPLICABILITY

As described above, the present invention can provide a high-capacity nonaqueous electrolyte secondary battery which has excellent cycle life and which is reduced in battery swell after a charge/discharge cycle. Thus, industrial availability is significant.

The invention claimed is:

1. A negative electrode for nonaqueous electrolyte secondary batteries, comprising a negative electrode core member and a negative electrode mixture layer attached to the negative electrode core member, wherein the negative electrode mixture layer contains negative electrode active material particles with a graphite structure and a binder, the mixture density of the negative electrode mixture layer is 1.5 g/cm$^3$ to 1.8 g/cm$^3$, the ratio I(002)/I(110) of the diffraction intensity I(002) of the (002) plane to the diffraction intensity I(110) of the (110) plane satisfies 60≤I(002)/I(110)≤120 as determined by measuring the negative electrode mixture layer by an X-ray diffraction method, the amount of particles with a size of 1 μm to 10 μm in the particle size distribution of the negative active material particles is 12% to 25% by volume.

2. The negative electrode for nonaqueous electrolyte secondary batteries according to claim 1, wherein the binding strength between the negative electrode active material particles is 3 kgf/cm$^2$ or more.

3. The negative electrode for nonaqueous electrolyte secondary batteries according to claim 1, wherein the negative electrode mixture layer has a sheet resistance of 2.5 Ω/sq or less in a discharged state as determined by a four-probe method.

4. A nonaqueous electrolyte secondary battery comprising the negative electrode according to claim 1 and a nonaqueous electrolyte.

5. The nonaqueous electrolyte secondary battery according to claim 4, wherein the nonaqueous electrolyte contains a nonaqueous solvent and a lithium salt dissolved in the nonaqueous solvent and the nonaqueous solvent contains 5% to 50% by volume of a fluorobenzene compound.

\* \* \* \* \*